(12) United States Patent
Sidhu et al.

(10) Patent No.: US 9,251,271 B2
(45) Date of Patent: Feb. 2, 2016

(54) SEARCH QUERY DISAMBIGUATION CONFIRMATION

(75) Inventors: Kulraj Sidhu, Rockville, MD (US); Abdur R. Chowdhury, Oakton, VA (US)

(73) Assignee: FACEBOOK, INC., Menlo Park, CA (US)

(*) Notice: Subject to any disclaimer, the term of this patent is extended or adjusted under 35 U.S.C. 154(b) by 138 days.

(21) Appl. No.: 13/620,600

(22) Filed: Sep. 14, 2012

(65) Prior Publication Data

US 2013/0173608 A1 Jul. 4, 2013

Related U.S. Application Data

(63) Continuation of application No. 12/723,778, filed on Mar. 15, 2010, now Pat. No. 8,463,775, which is a continuation of application No. 11/559,241, filed on Nov. 13, 2006, now Pat. No. 7,716,236.

(60) Provisional application No. 60/824,525, filed on Sep. 5, 2006, provisional application No. 60/806,688, filed on Jul. 6, 2006.

(51) Int. Cl.
*G06F 17/30* (2006.01)

(52) U.S. Cl.
CPC .... *G06F 17/30867* (2013.01); *G06F 17/30398* (2013.01)

(58) Field of Classification Search
None
See application file for complete search history.

(56) References Cited

U.S. PATENT DOCUMENTS

| 6,006,218 | A | * | 12/1999 | Breese et al. ............. 1/1 |
| 6,334,110 | B1 | | 12/2001 | Walter et al. |
| 6,631,496 | B1 | | 10/2003 | Li et al. |
| 6,751,606 | B1 | * | 6/2004 | Fries et al. ............. 1/1 |
| 6,772,150 | B1 | * | 8/2004 | Whitman et al. ............. 707/721 |
| 7,162,473 | B2 | | 1/2007 | Dumais et al. |
| 7,177,904 | B1 | | 2/2007 | Mathur et al. |
| 7,181,438 | B1 | | 2/2007 | Szabo |
| 7,225,187 | B2 | | 5/2007 | Dumais et al. |
| 7,237,191 | B1 | | 6/2007 | Sulistio et al. |
| 7,275,063 | B2 | | 9/2007 | Horn |
| 7,386,542 | B2 | | 6/2008 | Maybury et al. |
| 7,716,236 | B2 | | 5/2010 | Sidhu |
| 7,774,341 | B2 | | 8/2010 | Aravamudan et al. |
| 8,463,775 | B2 | | 6/2013 | Sidhu |
| 2002/0052782 | A1 | | 5/2002 | Landesmann |
| 2002/0156776 | A1 | * | 10/2002 | Davallou ............. 707/3 |
| 2003/0229537 | A1 | | 12/2003 | Dunning et al. |
| 2004/0203630 | A1 | | 10/2004 | Wang |
| 2005/0021504 | A1 | | 1/2005 | Atchison |
| 2005/0071741 | A1 | * | 3/2005 | Acharya et al. ............. 715/500 |
| 2005/0076019 | A1 | | 4/2005 | Jackson et al. |
| 2005/0234881 | A1 | | 10/2005 | Burago et al. |
| 2005/0278302 | A1 | | 12/2005 | Ritter |

(Continued)

OTHER PUBLICATIONS

International Search Report issued in PCT/US07/72939, dated Jul. 17, 2008, 9 pages.

(Continued)

*Primary Examiner* — Bai D. Vu
(74) *Attorney, Agent, or Firm* — Keller Jolley Preece

(57) ABSTRACT

A user is made able to configure a search query to be responsive to temporal factors in order to adjust the search query to more accurately reflect the user's true information need. By adjusting the search query in this way, the user is more likely to receive satisfactory search results.

20 Claims, 13 Drawing Sheets

(56) References Cited

U.S. PATENT DOCUMENTS

| | | |
|---|---|---|
| 2005/0289106 A1 | 12/2005 | Petri et al. |
| 2006/0023945 A1 | 2/2006 | King et al. |
| 2006/0041549 A1* | 2/2006 | Gundersen et al. ............. 707/5 |
| 2006/0041828 A1* | 2/2006 | King et al. ................ 715/500 |
| 2006/0064411 A1 | 3/2006 | Gross et al. |
| 2006/0101005 A1 | 5/2006 | Yang et al. |
| 2006/0148528 A1 | 7/2006 | Jung et al. |
| 2006/0206454 A1 | 9/2006 | Forstall et al. |
| 2006/0248073 A1 | 11/2006 | Jones et al. |
| 2006/0259861 A1* | 11/2006 | Watson ........................ 715/705 |
| 2006/0294223 A1 | 12/2006 | Glasgow et al. |
| 2007/0050339 A1 | 3/2007 | Kasperski et al. |
| 2007/0061195 A1* | 3/2007 | Liu et al. ..................... 705/14 |
| 2007/0061363 A1 | 3/2007 | Ramer et al. |
| 2007/0088686 A1 | 4/2007 | Hurst-Hiller et al. |
| 2007/0185831 A1 | 8/2007 | Churcher |
| 2007/0220010 A1 | 9/2007 | Ertugrul |
| 2007/0266025 A1 | 11/2007 | Wagner et al. |

OTHER PUBLICATIONS

U.S. Appl. No. 11/559,241, May 5, 2008, Office Action.
U.S. Appl. No. 11/559,241, Dec. 1, 2008, Office Action.
U.S. Appl. No. 11/559,241, May 27, 2009, Office Action.
U.S. Appl. No. 11/559,241, Dec. 22, 2009, Notice of Allowance.
U.S. Appl. No. 12/723,778, Sep. 16, 2010, Office Action.
U.S. Appl. No. 12/723,778, Mar. 25, 2011, Notice of Allowance.
U.S. Appl. No. 12/723,778, Jul. 8, 2011, Office Action.
U.S. Appl. No. 12/723,778, Dec. 20, 2011, Office Action.
U.S. Appl. No. 12/723,778, Aug. 30, 2012, Office Action.
U.S. Appl. No. 12/723,778, Apr. 15, 2013, Notice of Allowance.

* cited by examiner

FIG. 3A

Temporal Session Feature Vector

| Word #1 | Word #2 | Word #3 | Classification #1 | Classification #2 | Classification #3 |
|---|---|---|---|---|---|
| Dorothy | Oz | Wizard | Movies | Theatre | Movie Trivia |
| Weight | No Weight | Weight | Weight | No Weight | Weight |
| 8:15 AM 8/25/06 | 8:00 AM 8/25/06 | 8:15 AM 8/25/06 | 8:15 AM 8/25/06 | 8:00 AM 8/25/06 | 8:15 AM 8/25/06 |

700 — 701 — 702

Search Query Feature Vector

| Query | Time Received | Specialized Query | Potential Classification #1 | Potential Classification #2 | Potential Classification #3 |
|---|---|---|---|---|---|
| Toto | 9:00 AM 8/26/06 | No | Band | Plumbing Products | Movies |

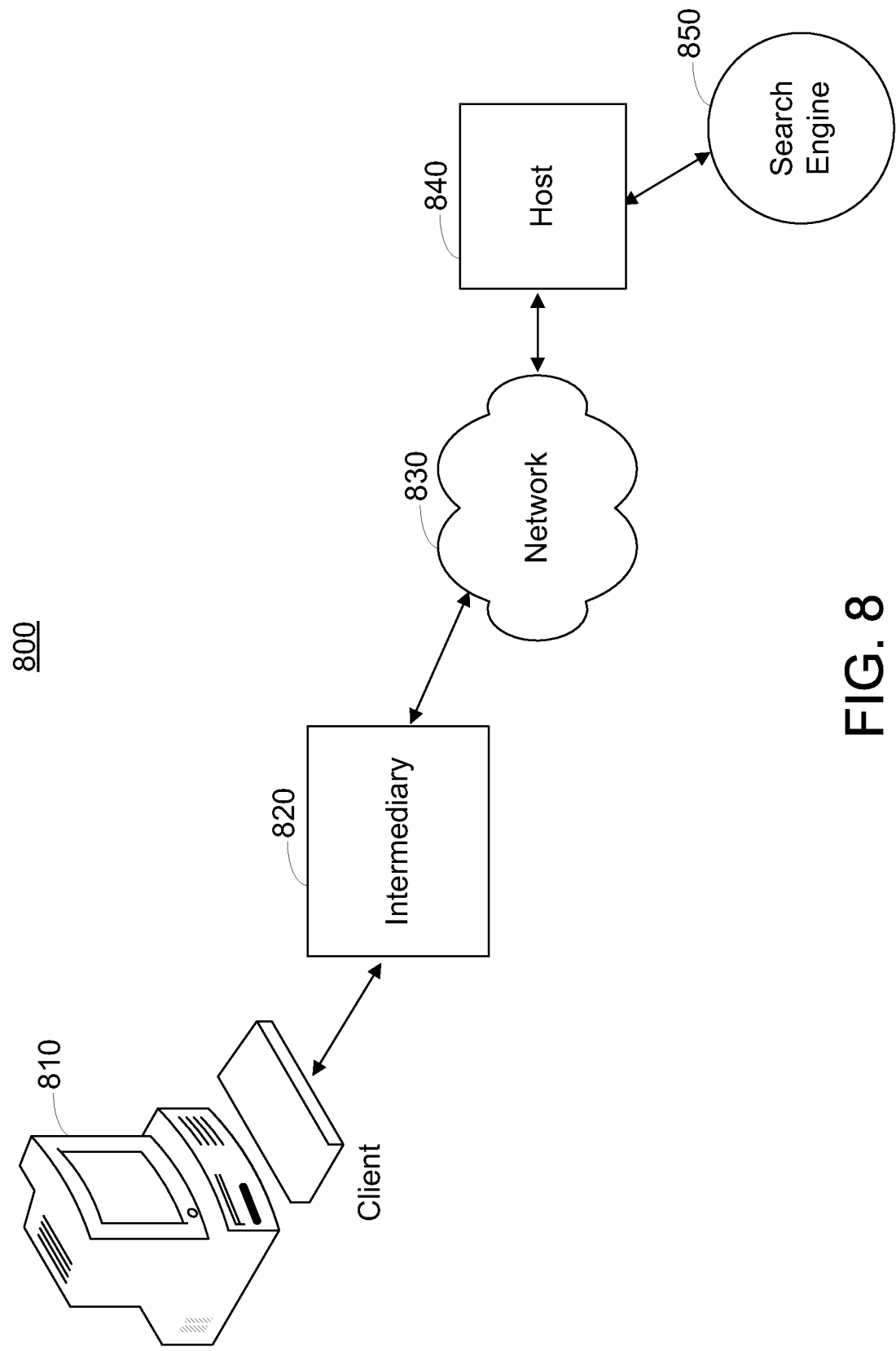

SEARCH QUERY DISAMBIGUATION CONFIRMATION

CROSS REFERENCE TO RELATED APPLICATIONS

The present application is a continuation of U.S. application Ser. No. 12/723,778 filed Mar. 15, 2010, which is a continuation of U.S. application Ser. No. 11/559,241 filed Nov. 13, 2006, which is now issued as U.S. Pat. No. 7,716,236, which claims the benefit of and priority to U.S. provisional application No. 60/824,525 filed Sep. 5, 2006 and U.S. provisional application No. 60/806,688 filed Jul. 6, 2006. Each of the aforementioned patent(s) and application(s) are hereby incorporated by reference in their entirety.

TECHNICAL FIELD

This disclosure relates to temporal search query personalization.

BACKGROUND

Users may access the Internet to retrieve content that fills an information need. To do so, for example, a user accesses a search engine and supplies a search query that represents the user's information need. The search engine then searches the Internet to identify content (e.g., a web page) that is responsive to the search query, and hopefully, satisfies the user's information need. The search engine then presents search results corresponding to the identified content, where a user may select a search result in order to access to the content corresponding with the selected search result.

SUMMARY

In a general aspect, search results are provided to a user. A search query is received from a user and a time component is determined to be associated with the search query. A time-oriented profile that includes information about monitored browsing behaviors is accessed and a subset of information from within the time-oriented profile is identified based on the time component associated with the received search query. The search query is related to the subset of information identified from within the time-oriented profile. Based on the results of relating, the user is provided with search results that account for one or more of the monitored browsing behaviors within the subset of the information identified from within the time-oriented profile.

With respect to at least the general aspect, implementations may include one or more of the following. For example, the search query may be adjusted to include information that is associated with the time component and that is included in the time-oriented profile, based on the results of the relating. The search results may be responsive to the adjusted search query.

The search results may include temporally-based search results that are responsive to the adjusted search query and temporally-independent search results that are responsive to the search query as provided by the user. The search results may be provided to the user such that the user can perceive a difference between the temporally-based search results and the temporally-independent search results, or the search results may be provided to the user such that the user cannot perceive a difference between the temporally-based search results and the temporally-independent search results.

Determining the time component may include enabling the user to specify a time component. A time component may be recommended to the user based on a time frame during which the user's browsing behaviors were related to the search query and the user may be enabled to select the recommended time component.

Determining the time component may include identifying a time component based on a time frame during which the user's browsing behaviors were related to the search query and the identified time component is automatically selected. The user may be advised of the automatically selected time component and the user may be enabled to reject the automatically selected time component.

The information related to the monitored browsing behaviors may include information related to content accessed by the user as part of the monitored browsing behaviors, a classification of the information, and a time indication of when the user performed the activity related to the information. The information, classification and time indication may be stored within the time-oriented profile for a predetermined amount of time.

A feature vector may be generated for documents accessed by the user during the browsing. A feature vector for a document may include at least one of information related to words appearing in the document based on their relative frequency of occurrence within the document, an indication of a time frame during which the document had been accessed by the user, a length of the document, an indication of where the document is stored and accessed from, an indication of how much useful information the document includes, and a classification related to the document.

A temporal session feature vector may be generated and stored based on at least one feature vector formed for at least one document accessed by the user prior to receipt of the search query. The temporal session feature vector may include, with respect to the accessed documents, at least one of words appearing in the documents based on a relative frequency of occurrence of the words within the documents, classifications related to the documents or the words, a time indication related to when the user accessed the documents that include the words and/or classifications. The temporal session feature vector may include an indication of a weight associated with at least one the words or classifications.

Relating the search query to the subset of information identified from within the time-oriented profile may include determining if a feature vector associated with the search query is similar to information included in the temporal session feature vector that is associated with the time component.

The he feature vector associated with the search query may include at least one of the full query, an indication of a time at which the query was received, whether the query was entered into a specialized search engine interface, and potential classifications related to the query.

Information in the temporal session feature vector may be associated with the time component if the information was included in, or associated with, a document accessed by the user within a time frame that satisfies the time component.

The search results may be provided based on processing by a third party plug-in.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIGS. 3A and 3B illustrate user interfaces (UIs) that show web pages browsed by a user.

FIG. 7 illustrates two exemplary data structures representing a temporal session feature vector and a feature vector associated with a search query, respectively.

FIG. 8 is a block diagram of an exemplary communications system that includes a client configured to communicate with a host, which includes a search engine, via a network and an intermediary.

DETAILED DESCRIPTION

Using technology described by this disclosure, a user is made able to configure a search query to be responsive to temporal factors in order to narrow the search query to more accurately reflect the user's true information need. By narrowing the search query in this way, the user is more likely to receive satisfactory search results.

In one exemplary implementation, a user's web browsing behavior is monitored and a time-oriented profile reflecting the user's web browsing behavior is generated. For example, the time-oriented profile may include an indication of web sites that were accessed by the user (and when). A search query then is received from the user, with an indication of a corresponding time component. The search query is compared to information included in the time-oriented profile that is associated with a time frame that corresponds to the time component. For example, the search query may indicate an interest in movies and may correspond to a time component of "past day" and the time-oriented profile may indicate that the user retrieved information related to a specific movie approximately within the past day. If relating the time component to the search query supports adjusting the search query, the search query may be adjusted so that search results may be responsive to the time component. In the foregoing example, relating the search query to the time-oriented profile may be used to identify search results that are related to the content associated with the specific movie accessed by the user in the past day. As a result, the user may easily access content that is responsive to the search query and likely relevant to content the user seeks.

In a more detailed example, search queries related to a proper name of a movie character, such as the dog "Toto" from the movie The Wizard of Oz, returns search results from disparate topics unrelated to The Wizard of Oz (e.g., Toto the musical group or TOTO USA, a manufacturer of plumbing products). If a user wishing to see search results related to the dog "Toto" has user profile, or other information (e.g., pre-search browsing history that includes cached web pages or metadata descriptive of previously accessed web pages) relating to The Wizard of Oz, the search engine may be configured to use this information to determine whether to prioritize search results relating to the dog "Toto" or alternatively, to limit search results to those relating to the dog "Toto." If no user profile or other information related to The Wizard of Oz exists, the user may be provided with general search results that are not geared towards any one interpretation of the word "Toto."

Figure 1A:
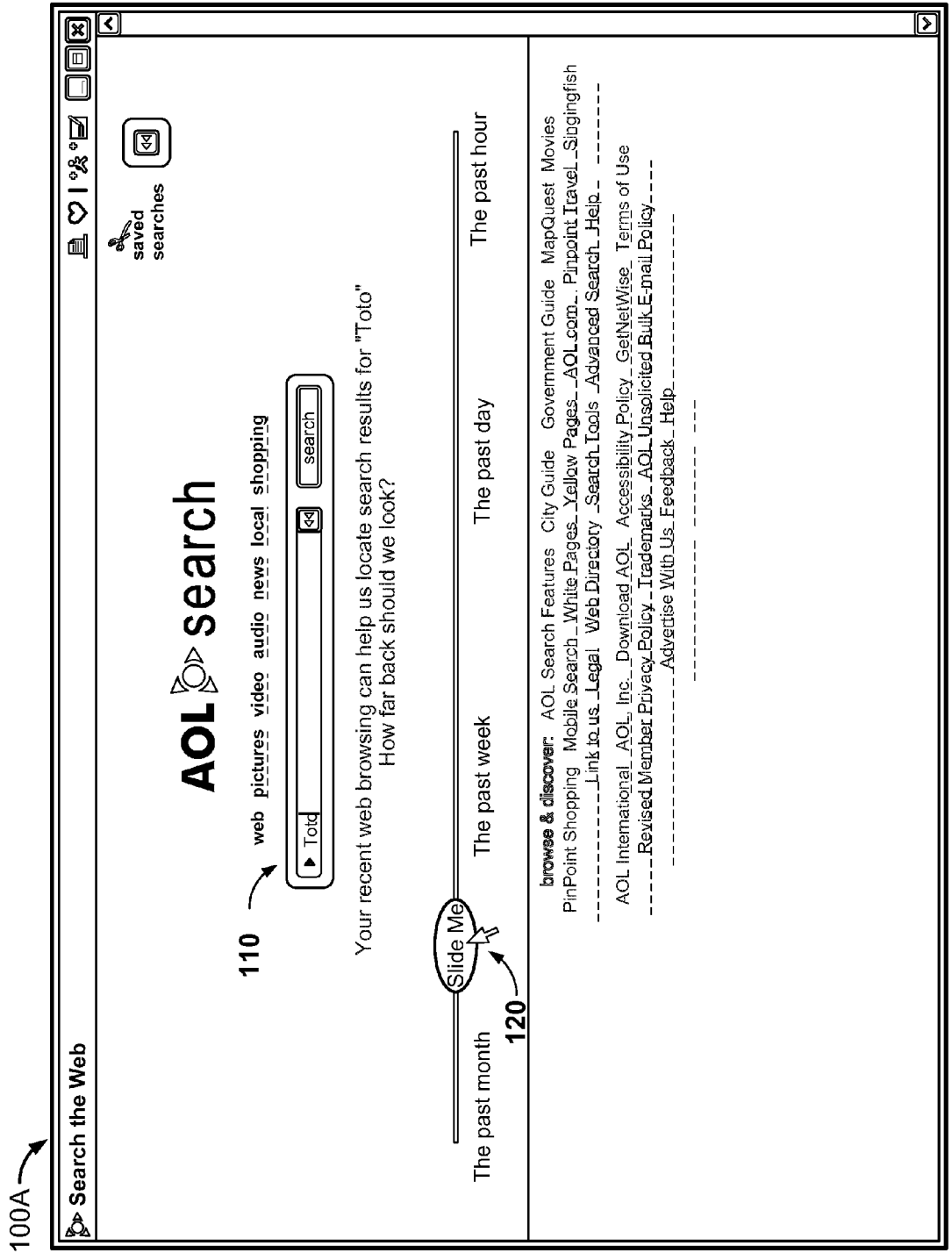
FIG. 1A is an illustration of an exemplary UI configured to enable a user to provide a search query and select a time component to be associated with the search query.

The UI 100A of FIG. 1A is configured to allow a user to provide a search query 110 and a corresponding time component using slider bar 120.

Slider bar 120 enables the user to specify a time frame to which the search query 110 should be responsive. More precisely, slider bar 120 may be used to identify a particular time component within the time oriented profile to which search results should be responsive.

For example, a user has entered "Toto" as a search query 110. Additionally, the user has chosen a time frame between the past month and the past week using slider bar 120. The user may select other time frames as the time component, including the past day and the past hour.

Figure 1B:
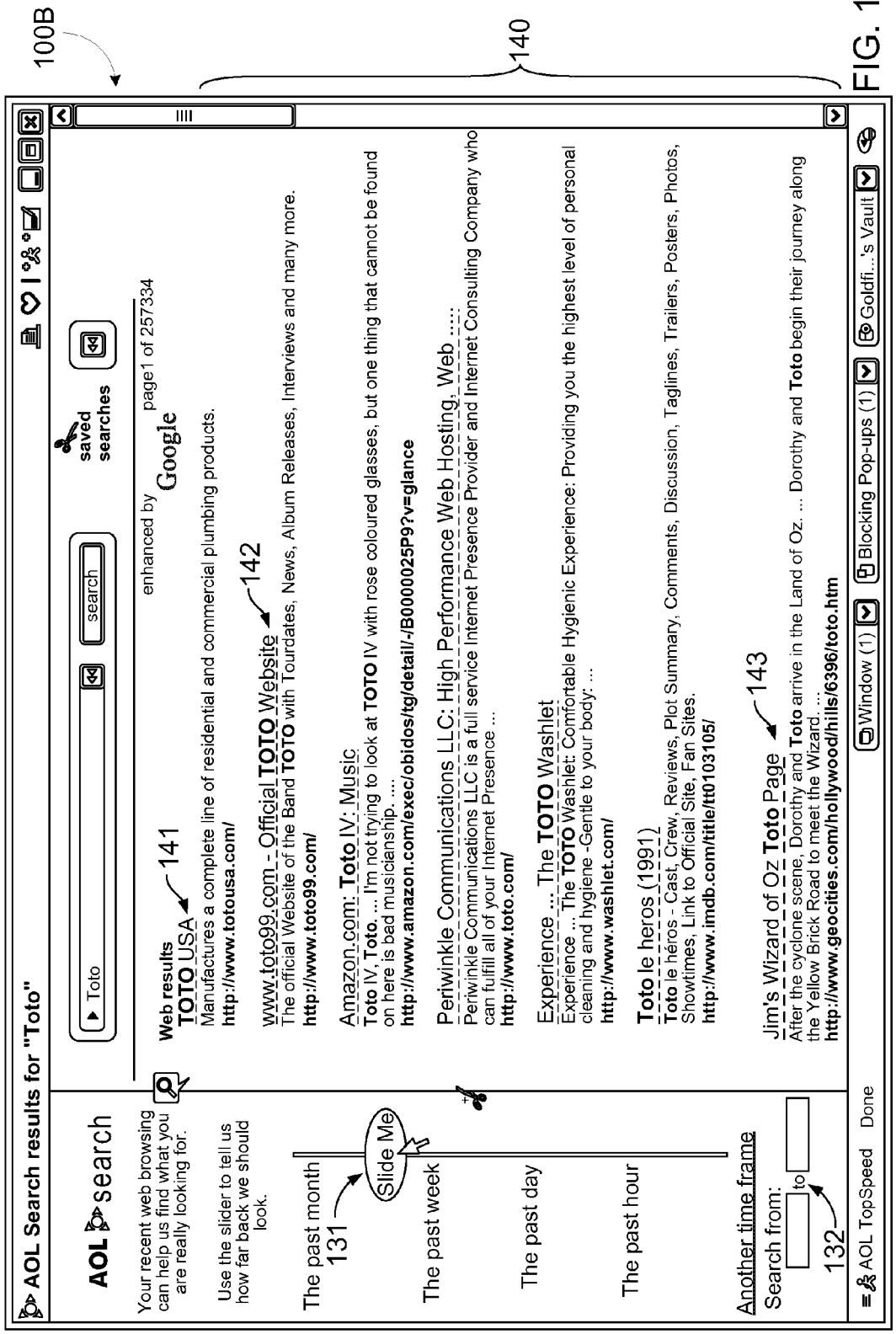
FIG. 1B is an illustration of an exemplary user interface (UI) that displays search results along with a tool configured to enable adjustment of the search results responsive to a time component.

The UI 100B of FIG. 1B displays search result list 140 along with tools 131 and 132 configured to enable adjustment of the search result list 140 based on a user-selected time component. Search result 141 appears first in list 140 followed by other search results including search result 142 and search result 143. Assuming the search query "Toto" represents the user's desire to receive information related to the dog Toto, search results 141 and 142 are inconsistent with the user's information need, whereas search result 143 is responsive to the user's information need.

UI 100B shows two examples of a tool—a sidebar 131 and input boxes 132 that a user may use to adjust the search results provided in list 140 to produce a list of search results (not shown) that accounts for a time frame specified by the user through use of the tool. For instance, the user may use slider bar 131 to select a particular time component (e.g., past month), or the user may provide a specific time range into input boxes 132 to tailor the search results to the provided time component.

Stated differently, and with somewhat greater detail, as a result of entering "Toto" as search query 110, search results 141-143 related to three different topics are displayed. Only search result 143 is responsive to the user's interest in receiving information for Toto the dog from The Wizard of Oz. Search results 141 and 142 are displayed above search result 143 and represent unrelated topics that happen to share the name "Toto." This positioning of search results 141-143 may be based on some predetermined and default ranking algorithm, such as based on popularity of content corresponding to the search results. Slider bar 131 or input boxes 132 may be used to adjust the search, and consequently the search results, to elevate the prominence of search results responsive to the time-oriented profile (and thus the user's true information need), such as, for example, by providing search result 143 first among search results 141-143 (as illustrated by FIG. 1C).

Figure 1C:
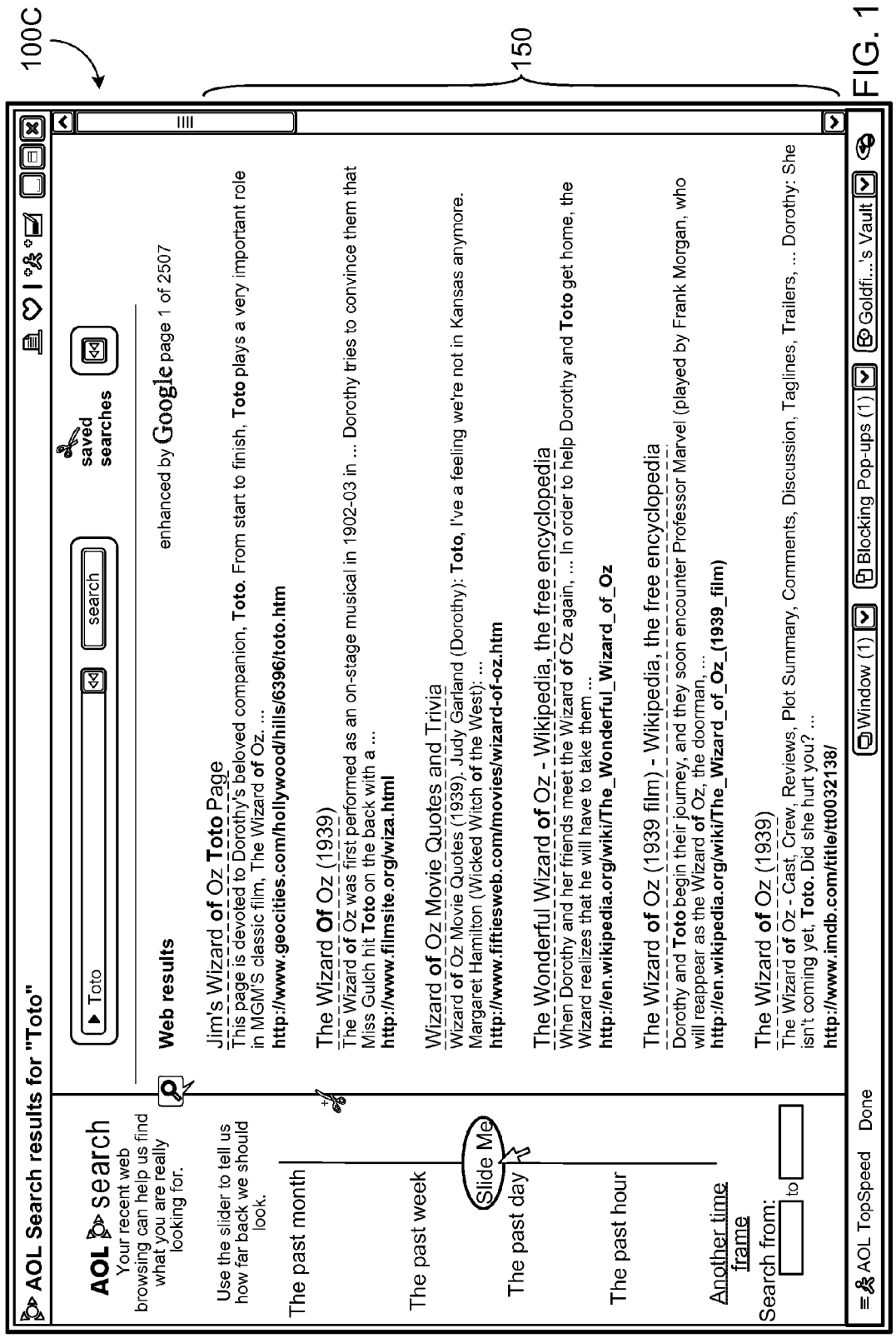
FIG. 1C is an illustration of an exemplary UI that displays a search results that have been adjusted to be responsive to a selected time component.
Figure 1D:
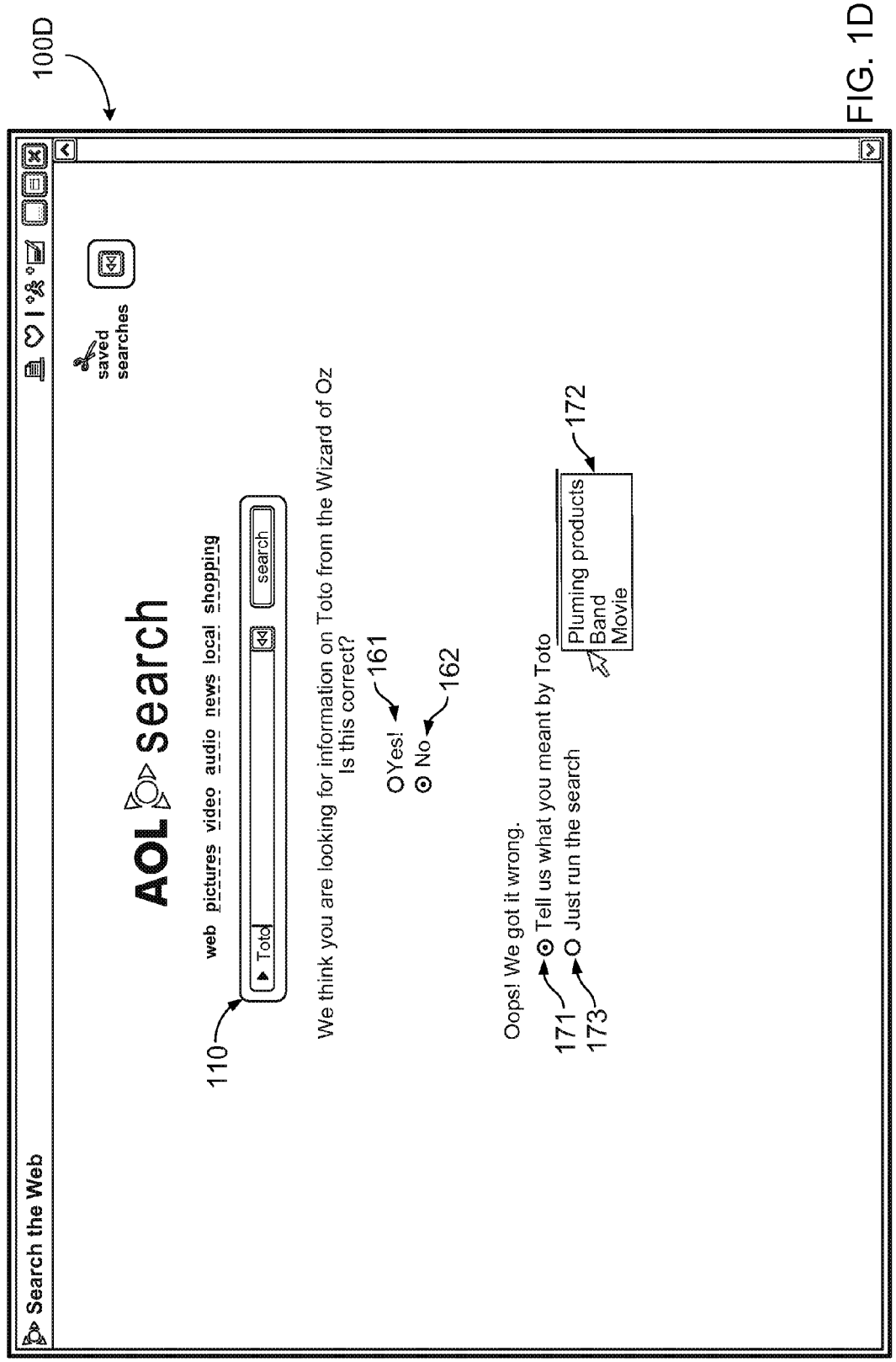
FIG. 1D is an illustration of an exemplary UI enabling a user to perceive information gleaned from a time-oriented profile and choose whether or not to adjust search results based on such information.

The UI 100C of FIG. 1C displays search results that have been adjusted to be responsive to a selected time component, producing adjusted search result list 150. UI 100C may be produced, for example, as a result of using slider bar 120 or 131 in UIs 100A or 100B respectively. The elevation (e.g., boosting) of search results within search result list 150 now reflect a user's true information need related to "Toto" the dog, rather than search results for the musical group or plumbing manufacturing company, which appeared in search result list 140 of UI 100B.

The UI 100D of is configured to enable a user to perceive information gleaned from the user's time-oriented profile and select whether or not to adjust search results based on such information. More particularly, UI 100D includes radio buttons 161-162, radio buttons 171 and 173 and drop down menu 172.

As a result of entering search query 110 "Toto," information included in a time-oriented profile associated with the user who entered the search query 110 may be accessed to determine if, during any time frame, the user accessed information related to the word "Toto." If so, UI 100D may present the user with an indication of subject matter that is deemed to be related to the search query 110 "Toto" based on the user's pre-search browsing behavior, such as, for example, the statement "We think you are looking for information on Toto from The Wizard of Oz." The UI 100D also requests a response from the user on whether the statement is correct. Radio button 161 enables the user to indicate that the user did intend to find information about Toto from The Wizard of Oz. Alternatively, and in the example shown, the user has indicated that The Wizard of Oz is not what was intended by the search query "Toto" via radio button 162.

In response to selection of radio button 162, UI 100D notes "Oops! We got it wrong." Radio button 171 enables the user to adjust the search query 110, and thus, any corresponding search results, ("Tell us what you meant by Toto") to reflect a different relation to the search query "Toto" (e.g., the musical group or the plumbing manufacturer), which may or may not be identified in the time-oriented profile. The other interpretations for the search query 110 "Toto" may be determined from search results that are identified as responsive to the search query absent any influence from the time-oriented profile. Various different relations may be provided to a user in, for example, drop-down menu 172. As shown, the topics "plumbing products," "band" and "movie." In some implementations, radio buttons 171-172 may only be presented in UI 100D in response to user selection of radio button 162. Alternatively, radio buttons 171-172 may be present, but inactive (e.g., the radio buttons may be obscured or grayed out) until such time as a user has selected radio button 162.

Alternatively a user may select radio button 173 to execute the search query 110, without adjusting it to be responsive to a time component ("Just run the search") producing, for example, user interface 100B.

In some implementations, the "no" radio button 162 may alone be used to inspire blacklisting or demotion of Oz-related content that would otherwise be determined and revealed to the user as search results. In some implementations, selection of the "no" radio button 160 in conjunction with selection of a topic in the drop down menu 172 may be required to blacklist or demote Oz-related content.

UI 100D may be presented to a user in response to at least two events. First, the UI 100D may be presented to a user immediately (or substantially immediately) after the user has provided the search query 110, but before results corresponding thereto are determined or presented to the user. Second, the UI 100D may be presented to the user in connection with, and at approximately the same time as, results determined in response to the search query.

A selected time component and/or relationship between the search query 110 and a user's pre-search browsing behavior, as selected using UIs 1A-1D, may be used to narrow (e.g., filter) search results that may otherwise be provided to a searching user. In some implementations, the search query itself may be modified based on the searching user's inputs to UIs 1A-1D. For example, upon selection of the relation "plumbing products," the search query "Toto" may be modified to become an adjusted search query "Toto plumbing" or "Toto plumbing products." Alternatively, the original search query may be compared against a corpus of information to produce search results that are not limited based on the user's inputs into UIs 1A-1D. The search results may then be filtered or organized based on the user's inputs. For example, if the user selects the relation "plumbing products," search results related to information other than plumbing products may be filtered out of a search result list provided to a searching user. Alternatively, search results related to plumbing products may be provided within a search result list at a visually prominent position, such as, for example, at the top of the search result list or under, for example, a "Plumbing Products" heading.

As described, the UIs of, FIGS. 1A-1D may be used to update search results based on a time-oriented profile that accounts for only the pre-search browsing activities of the user who provided the search query (i.e., the searching user). Additionally, or alternatively, search results may be based on browsing behavior performed prior to the instant search by other users, such as a subset of users who are known to the searching user (e.g., users included in a contact list maintained by the searching user or users with whom the searching user has communicated) and/or the general population of users (e.g., users not known to the searching user). Allowing a user to adjust search results based on pre-search browsing behavior of others may allow a user to tap into information that is temporally popular among other users, and thus more likely to be responsive to the searching user's own information need.

To inform an instant search query based on pre-search browsing behavior of others, a search system, such as, for example, the system included on host 840 of FIG. 8 that is described in more detail below, may maintain and/or access a data store of topics that are popular, or "hot," among users in general. Topics from among the "hot" topics list may be placed in a general time-oriented profile, with corresponding time components that describe how recently the topic has been accessed via browsing by other users. Additionally, or alternatively, the general time-oriented profile may be filtered to only include topics that are "hot" to users known to the searching user. A searching user may be made able to adjust search results based on the general time-oriented profile (or the filtered general time-oriented profile) by, for example, selecting a radio button, check box, or other user interface element, that may be added to one or more of UIs 100A-100D.

Figure 2:
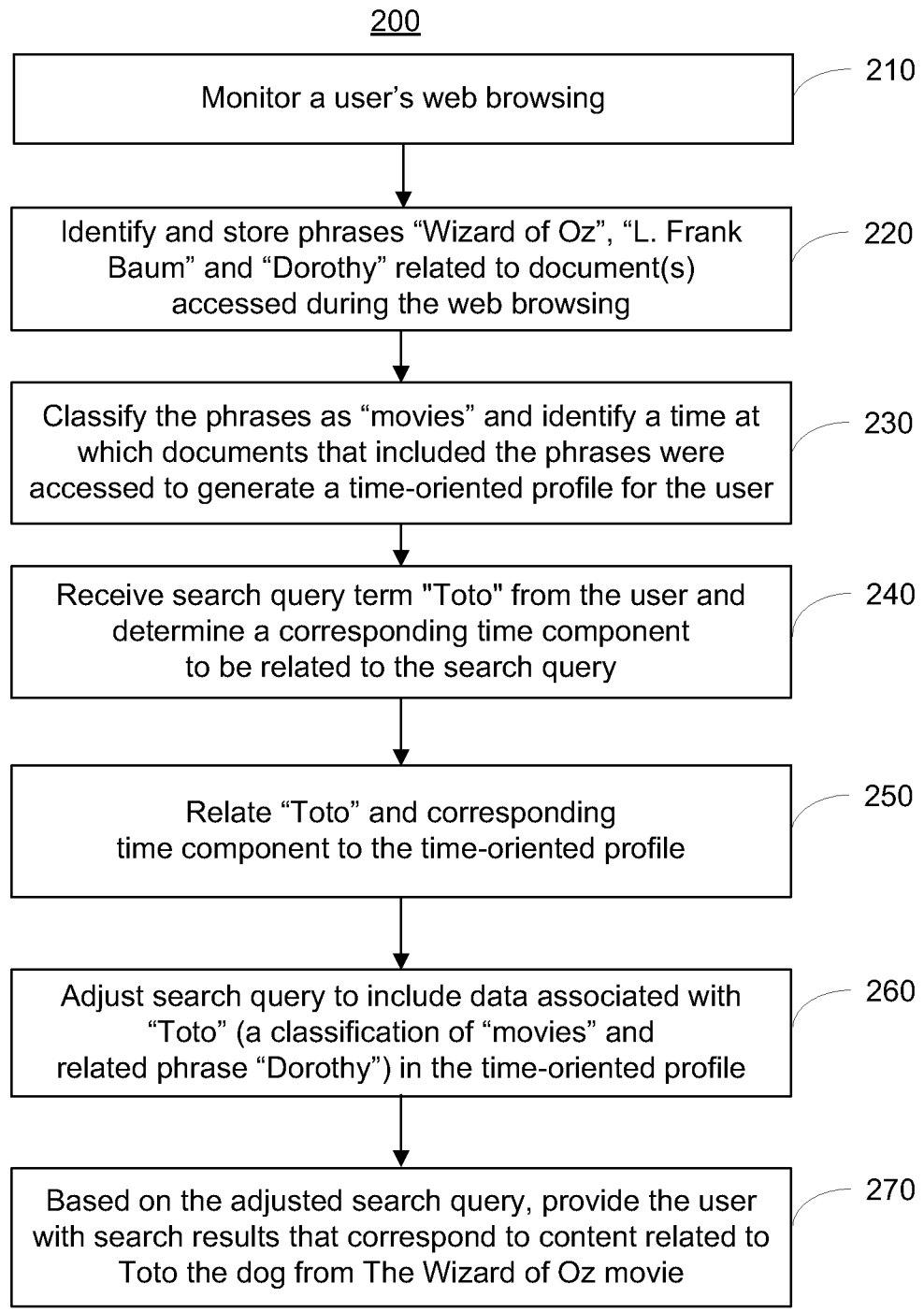
FIG. 2 is flow chart of an exemplary process by which a user is made able to perceive search results that are responsive to a search query and informed by the user's pre-search browsing behavior.

The exemplary process 200 of FIG. 2 is configured to allow a user to perceive search results that are responsive to a search query and informed by the user's pre-search browsing behavior. Generally, the operations of process 200 may be used in conjunction with the systems and configurations described below with respect to FIG. 8. For example, process 200 may be performed by host 840 of FIG. 8, as described in more detail below, and for convenience, host 840 is referenced as performing the process. However, similar methodologies may be applied in other implementations where different components are used to define the structure of the system, or where the functionality is distributed differently among the components shown.

Host 840 monitors a user's web browsing behavior (210). Monitoring may be performed by examining the user's browser history or cached web pages. For example, a user may browse documents that include information about the movie The Wizard of Oz.

Figure 3A:
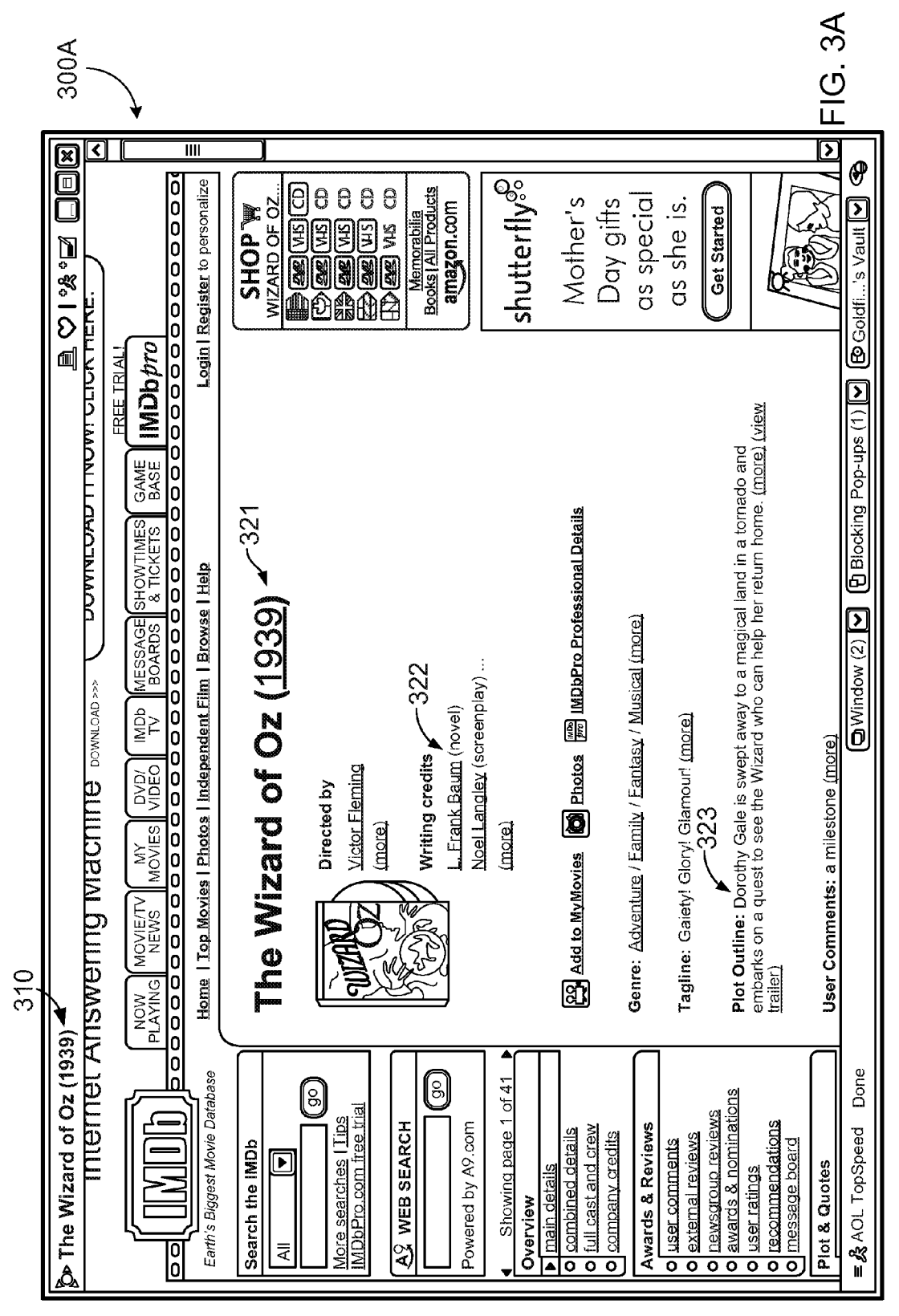
Figure 3B:
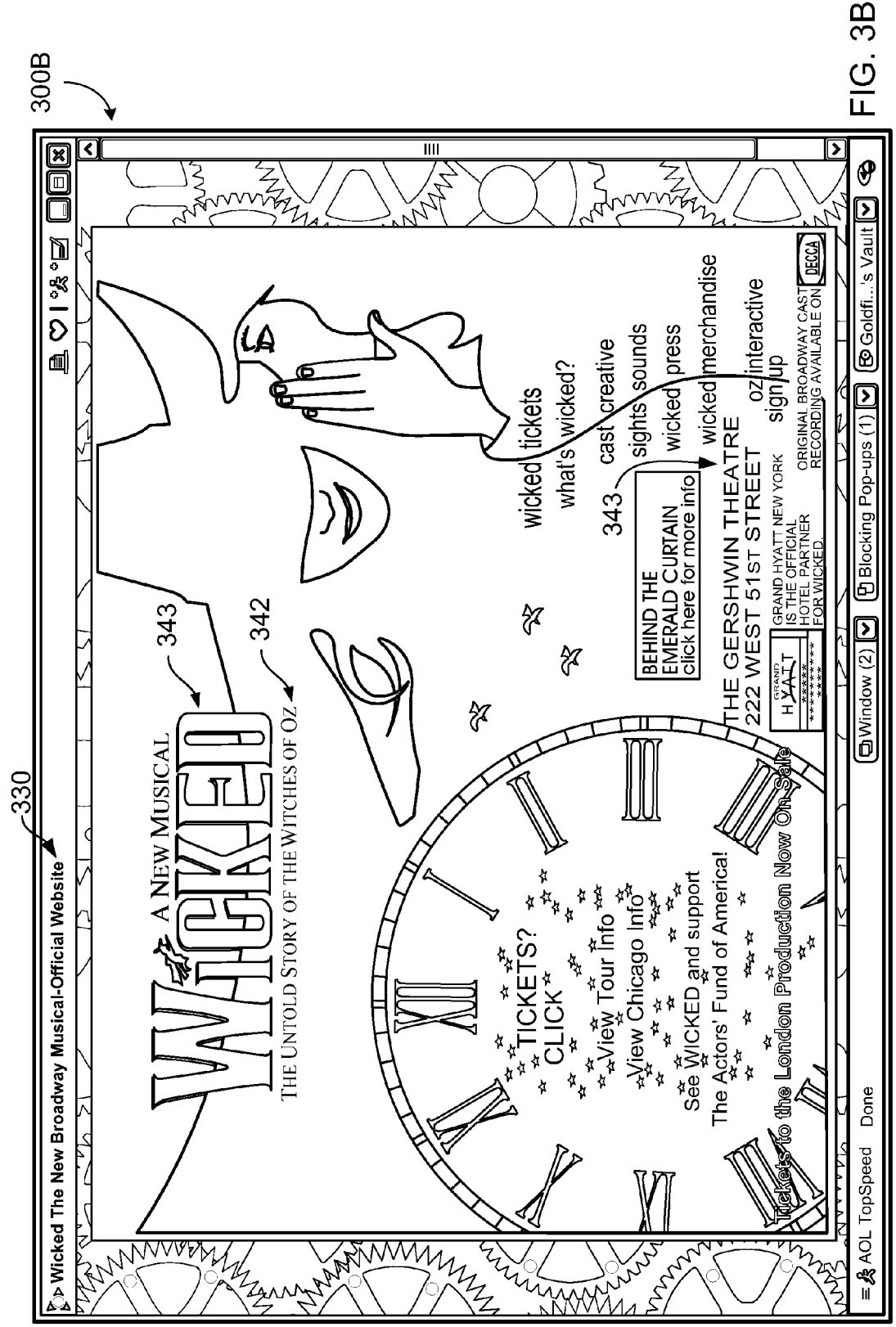

The documents may be, for example, shown in UIs 300A and 300B of FIGS. 3A and 3B, respectively. More particularly, the UI 300 of FIG. 3A displays a web page from a movie database detailing The Wizard of Oz movie and the UI 300B of FIG. 3B displays a web page that includes information related to the play "Wicked: The Untold Story of Wizard of Oz.".

UIs 300A and 300B each include words and phrases that may be related to the overall content of the web pages shown. For example, the web page shown in UI 300A includes page title 310 ("The Wizard of Oz (1939)"), movie title 321 ("The Wizard of Oz"), author 322 ("L. Frank Baum") and plot 323 ("Dorothy Gale is swept away . . . "). In another example, the web page shown in UI 300B includes page title 330 ("Wicked: The New Broadway Musical—Official Website"), play title 341 ("Wicked: The Untold Story of the Witches of Oz"), word 342 ("Oz") and location 343 ("theatre").

Host 840 stores the phrases "Wizard of Oz," "L. Frank Baum," and "Dorothy" which have been determined to be related to the documents accessed by the user during the pre-search web browsing (210). More particularly, host 840 identifies the phrases "Wizard of Oz," L. Frank Baum" and "Dorothy" from the web page shown in UI 300A as being important to the overall content included within the web page shown in UI 300A. Host 840 then stores the identified phrases to aid in determination of whether a search query is related to user profile or other information associated with a user who provided the search query.

Host 840 classifies the stored phrases as "movies" and identifies a time at which the document that included the phrases (e.g., the web page shown in UI 300A) was accessed by the user in order to generate a time-oriented profile for the user (230). As such, a time-oriented profile may include phrases identified from web pages browsed by the user, a classification related to the phrases and an indication of a time and date on which the document that included the phrases was accessed by the user. In some implementations, host 840 may access an ontology or a taxonomy to determine a classification associated with one or more of the phrases stored during operation 210. In the present example, host 840 may determine that the phrases "Wizard of Oz," "L. Frank Baum" and "Dorothy" belong to the classification "movies." Additionally, host 840 may determine a time at which the document that included the phrases was accessed by the user. For example, the host 840 may determine that the user accessed the document one hour ago, or alternatively, the host 840 may determine that the user accessed the document at 8:00 AM on Aug. 25, 2006. Thus, a time-oriented profile may be generated for the user that includes the phrases "Wizard of Oz," "L. Frank Baum" and "Dorothy," the classification "movies" and an indication that the phrases were accessed in a document at 8:00 AM on Aug. 25, 2006.

Host 840 receives a search query "Toto" from the user and determines a corresponding time component to be related to the search query (240). The time component may be determined based on user input. For example, and referring again to UI 100A of FIG. 1, the user may move slider 120 to a position for "past day." As such, the host 840 determines that the user wishes to associate a time component of the past day with the search query "Toto." Thus, search results provided in response to the search query "Toto" may be associated with pre-search browsing by the user during the past day. In some implementations, a default time component may be used when the user fails to select a time component. The default time component may be, for example, a large time component (e.g., the past month), a small time component (e.g., the past hour) or some other pre-determined or user-selected default value. Furthermore, a particular time component may be automatically selected for the user based on the user's pre-search browsing behavior, as described in more detail below with respect to FIG. 5.

The search query Toto" is related to the time-oriented profile associated with the user (250). More particularly, the term "Toto" and the corresponding time component "past day" are compared to the time-oriented profile previously generated for the user, as described above, to determine if the time-oriented profile includes information related to the search query at the time component specified. For example, the host 840 may determine that the term "Toto" is stored in the time-oriented profile and is associated with a time component of "past day."

As such, any classification information, as well as other words or phrases associated with the term "Toto" that relate to the information accessed by the user during a time frame corresponding to the time component may be used to adjust the search query in order to ensure that search results provided in response to the search query are informed by the classification and phrases associated with the term "Toto" in the time-oriented profile (260). For example, the search query "Toto" may be adjusted to be, for example, "Toto AND Oz," "Toto AND movies," or "Toto AND Dorothy." In some implementations, the search query "Toto" may be adjusted to specifically exclude interpretations that do not correspond to information stored in the time-oriented profile at the particular time frame. For example, the search query "Toto" may be adjusted to be "Toto NOT plumbing" or "Toto NOT band OR plumbing."

Based on the adjusted search query, host 840 provides search results to the user that correspond to content related to Toto the dog from the movie The Wizard of Oz (270). As such, host 840 provides the user with search results that are likely to be responsive to the user's true information need.

Figure 4:
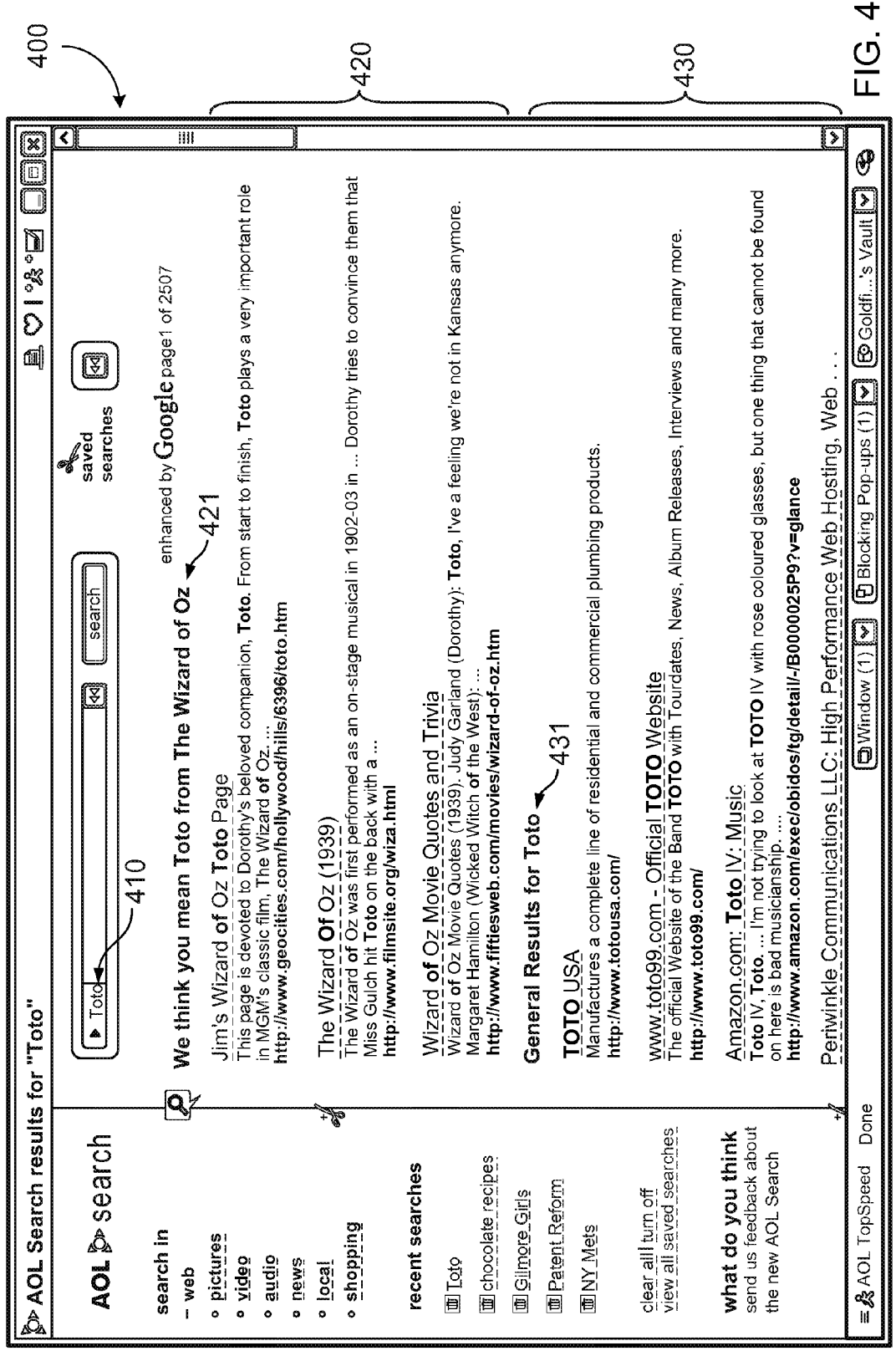
FIG. 4 is an illustration of an exemplary UI configured to provide a user with general search results that are responsive to an adjusted version of a search query and temporally-independent search results that are responsive to a non-adjusted version of the search query.

The UI 400 of FIG. 4 is configured to provide a user with both search results 420 that are responsive to an adjusted version of search query 410 and temporally-independent search results 430, which are responsive to a non-adjusted version of search query 410. More particularly, user interface 400 enables a user to perceive a difference between search results 420, which are shown under an enhanced search results header 421 ("We think you mean Toto from The Wizard of Oz") and search results 430, which are also shown under an enhanced header 431 ("General Results for Toto").

Search results 420 are search results that have been informed by data within a time-oriented profile associated with the user based on the search query and a corresponding (and user-provided or automatically generated) time component. For example, the search results 420 are responsive to not only the search query "Toto," but also phrases "Dorothy" and "L. Frank Baum," which appear in the user's time-oriented profile as being associated with a time component (provided by the user in, for example, UI 100A of FIG. 1A) of "past day." As such, search results 420 correspond to content related to The Wizard of Oz.

Search results 430 are search results that have not been informed by data within the user's time-oriented profile. As such, search results 430 correspond to content related to various interpretations of the word "Toto," such as, for example, the plumbing products manufacturer and the band. In some implementations, search results 430 may explicitly exclude search results that correspond to content related to "Toto" the dog from The Wizard of Oz since search results for this particular interpretation of the word "Toto" may be fully covered within search results 420. Alternatively, or additionally, a user may specify whether search results 430 should include search results associated with the "Toto" the dog interpretation. A user may wish to so include the dog search results in search results 430 to determine where these search results fall (e.g., their relative ranking) within the general search results 430. The enhanced search results header 431 may change depending on the categories of search results included in search results 420.

Figure 5:
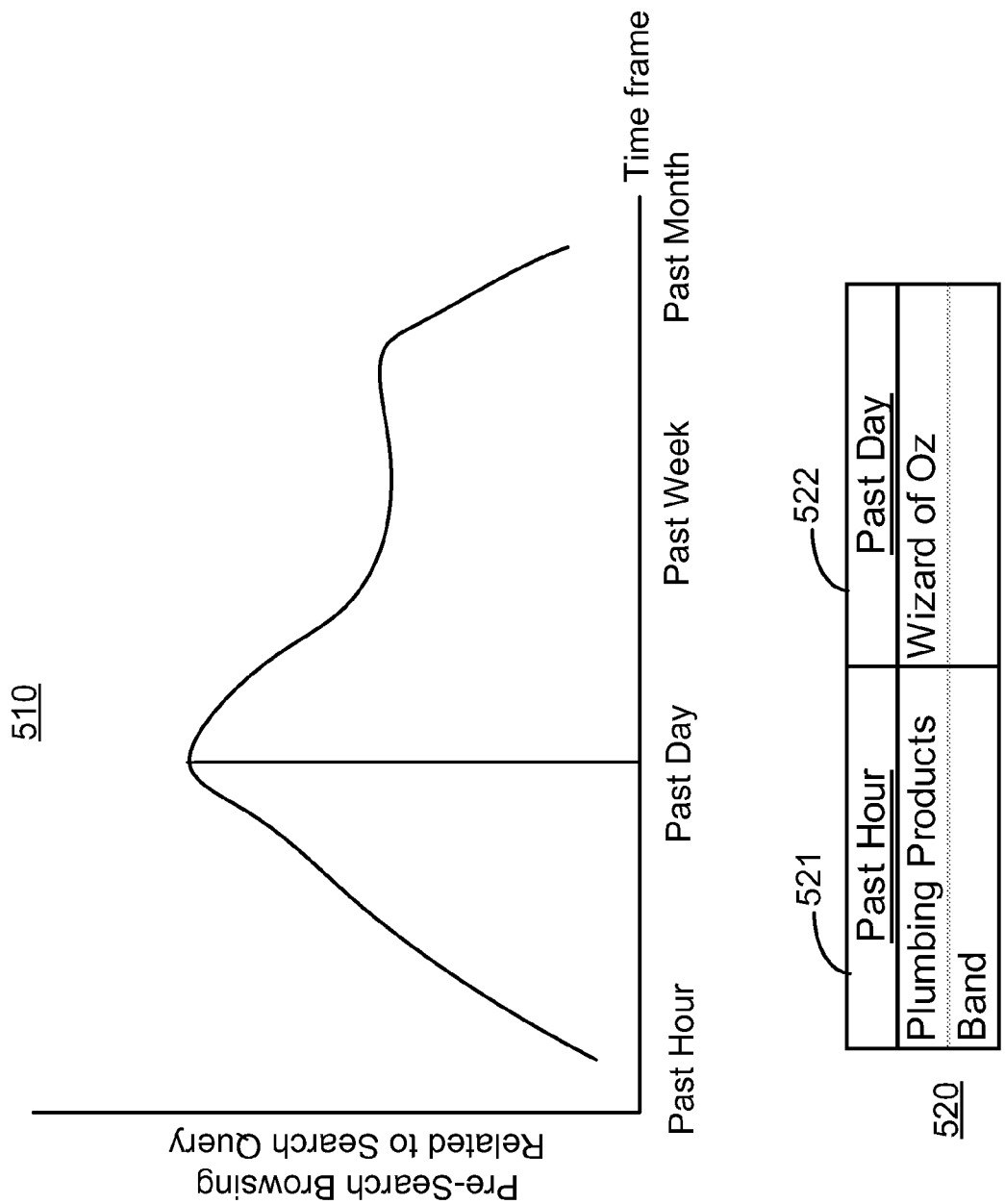
FIG. 5 illustrates an exemplary graph depicting a relationship between a user's pre-search browsing behavior and a search query over time, as well as a table that includes data related to search results that may be provided to the user for various time components.

The graph 510 of FIG. 5 depicts a relationship between a user's pre-search browsing behavior and a search query over time, as well as a table 520 that includes data related to search results that may be provided to the user for various time components.

More particularly, and for example, graph 510 shows a number of web pages (or, in some implementations, other Internet or local content) that were browsed by a user pre-search during a particular time frame, and that include content related to a search query provided by the user. For example, during the "past day" time frame, the user browsed a large number of web pages that include content related to a search query, such as, for example, the search query "Toto." In contrast, during the time frame "past hour," the user browsed almost no web pages that include content related to the search query "Toto."

When a user provides a time component with a search query (by, for example, moving a slider), the search results provided to the user in response may be informed by the user's browsing behavior during a time frame associated with the time component. For example, if in the past day, a user browsed web pages related to The Wizard of Oz, any search results provided to the user for a search query that is related to The Wizard of Oz (among other things) may be included, when otherwise those search results would not.

Because search results provided to a user depend on a particular time component, table 520 shows topics related to search results that may be provided to a user in response to a search query and a particular time component. During the time frame "past hour," and as shown in graph 500, the user browsed very few, if any, web pages related to the search query "Toto." Thus, search results provided for the search query "Toto" may include general search results (e.g., related to plumbing products or the band) since a time-oriented profile associated with the user does not include any information that is helpful in determining search results that are more likely than not to satisfy the user's true information need, as shown in table 520 at column 521.

During the time frame "past day," the user browsed a large number of web pages related to the search query "Toto." Such a relationship may be determined based on a comparison of the search query with phrases and other information (e.g., metadata, uniform resource locator or referring page information) detected within particular web pages browsed by the user prior to performance of the search. Because the user browsed a great number of web pages related to the search query "Toto," the content of those web pages may be used to inform search results provided in response to the search query "Toto." Because the web pages browsed are related to the movie The Wizard of Oz, the search results provided also may be associated with content related to Toto the dog of The Wizard of Oz, as shown in table 520 at column 522.

Similar data may be tabulated and stored within table 520 for the time frames of "past week" and "past month," although that information is not shown in FIG. 5.

In some implementations, graph 510 and table 520 (or the information stored therein) may not be made perceivable to a user. However, the information represented by graph 510 and table 520 may be used by host 840 to provide the user with a recommendation for a time component selection for a particular search query. For example, a user may provide a search query "Toto." Host 840 may determine, based on a time-oriented profile, that the phrase "Toto" is related to content included in one or more web pages that the user previously browsed. Based on the information provided in graph 510 and graph 520, the host 840 may determine a time frame during which the largest number of web pages that include content related to the search query were previously viewed by the user. For example, and as shown in graph 510, during the time frame "past day," the user browsed the largest number of web pages associated with the search query "Toto." Thus, search results provided in response to the search query "Toto" may be those most likely to satisfy the user's true information need if determination of those search results is informed by the web pages browsed during the time frame "past day." As such, the host 840 may present the user with an indication that a selection of a time component of "past day" associated with the search query "Toto" may yield more satisfactory search results, or alternatively, that such a selection may yield search results related to The Wizard of Oz. In some implementations, and as shown above in UI 100D of FIG. 1D, the user may be presented with an indication that the system has determined that the user is looking for information on The Wizard of Oz, and may enable the user to accept or reject this conclusion. Alternatively, the graph 510, table 520 and/or the information stored therein may be presented to a user to assist the user in selection of a time component associated with a particular search query.

Alternatively, or additionally, rather than providing the user with a recommended time component for user selection, the information in graph 510 and table 520 may be used by host 840 to automatically select a time component for a particular search query. For example, search results provided in response to the search query "Toto" may be most likely to satisfy the user's true information need if a time component of "past day," is associated with the search query. Thus, host 840 may automatically associate the "past day" time component with the search query "Toto." In some implementations, a user may be enabled to reject the automatically associated time component, and provide a substitute time component or elect to perform the search without an indication of a corresponding time component.

In some implementations and examples, a user may seek to find information included in a web page (or other Internet or local content) accessed by the user during a particular time frame. The user may adjust the time component associated with a search query (or without a search query, in some implementations, to simply view search results corresponding to previously accessed content) to establish the time frame during which the user viewed the particular material, and hopefully rediscover the previously accessed material. As such, the information provided in graph 510 and table 520 may not be useful to a user in this situation because the user may not seek search results for a search query that have been informed by a time period when the user browsed information related to the search query (e.g., such as in the example described above), but rather the user may desire to find information that the user previously accessed during a particular time frame.

Figure 6:
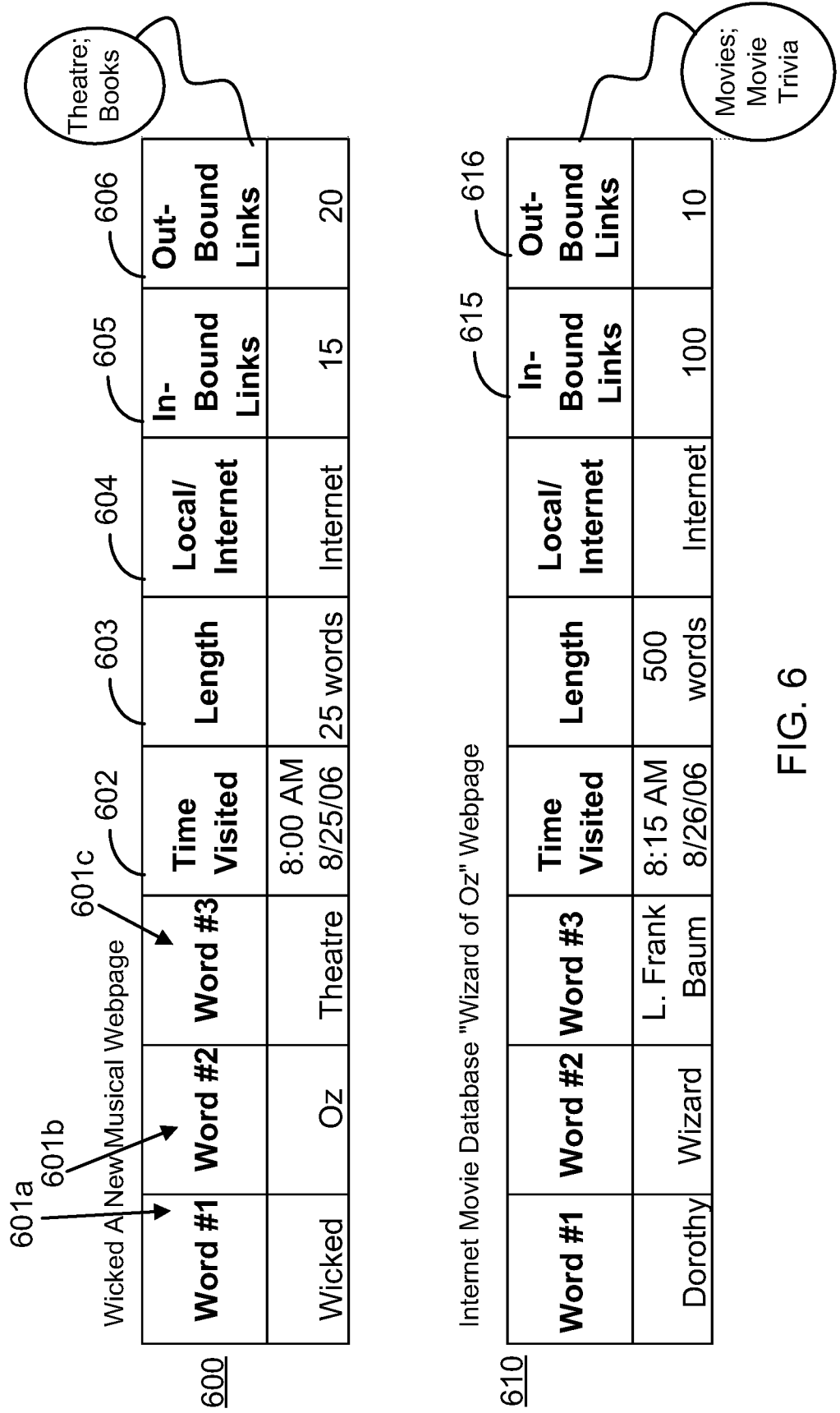
FIG. 6 illustrates two exemplary data structures that each represents a feature vector for a document viewed by a user.

The data structures 600 and 610 of FIG. 6 each represent feature vectors for documents shown in UIs 300A and 300B of FIGS. 3A and 3B, respectively. In general, a feature vector is an n-dimensional collection of data stored together to represent a relationship among the data.

Data structure 600 includes information related to words 601a-601c appearing in a document based on their relative frequency of occurrence. The data structure 600 also includes an indication of a time frame 602, which includes a particular time and date at which the document corresponding to the data structure 600 was accessed, such as, for example, "8:00 AM Aug. 25, 2006." Thus, an indication of how recently the document was viewed by the user may be determined on-the-fly based on a delta (e.g., 1 hour) between the current time and date (e.g., 9:00 AM Aug. 25, 2006) and the time stored in the time frame 602 field. Furthermore, data structure 600 includes a length 603 of the document, an indication of a location 604 where the document is stored, or accessed from, an indication of how much useful information the document includes based on a number of in-bound links 605 and outbound links 606 included within the document, and a classification 607 related to the document.

By way of example, and more particularly, data structure 600 includes words 601a-601c, "Wicked," "Oz" and "Theatre," respectively, that appear frequently in UI 300B when displaying the Wicked document or have been deemed to be representative of the overall content of the Wicked document. As shown in data structure 600, the time frame 602 is "8:00 AM Aug. 25, 2006," the length 603 is "25 words," the document storage location 604 is "Internet," and the classification 607 includes the categories "theatre" and "books."

For data structure 600, the number of in-bound links 605 is "15" and the number of out-bound links is "20," thereby providing an indication that there are less outside documents that link to the document to which data structure 600 relates, than the number of outside documents to which the document links. Thus, the document related to data structure 600 may represent a "hub" or "connector" document, rather than a useful source of information. In contrast, data structure 610 has far more in-bound links 615 (i.e., 100 in-bound links) than out-bound links 616 (i.e., 10 out-bound links), which may indicate that information included in the document to which data structure 610 relates may include more useful content, and thus may be more useful as a data element in a time-oriented profile for a user who accessed the document. For example, data structure 610 may prove helpful to a user searching for the dog "Toto" from The Wizard of Oz movie.

In some implementations, a document feature vector may be generated for each document accessed or viewed by a user. Alternatively, document feature vectors may be created for documents that the user viewed for more than a threshold amount of time (e.g., 30 seconds) based on the presumption that a user may spend more time viewing a document that is more significant to the user than those documents that the user disliked or found unhelpful. Additionally, or alternatively, a user may be enabled to indicate whether a feature vector should be created for a particular document accessed by the user.

The data structure 700 of FIG. 7 represents a temporal session feature vector and the data structure 710 also of FIG. 7 represents a feature vector associated with a search query. More particularly, data structure 700 illustrates a collection of information related to a web browsing session of a user during a particular time period. Data structure 700 is a representation of a storage mechanism for some, or all, of the information included in a time-oriented profile. To generate data structure 700, information stored in data structures 600 and 610 of FIG. 6 may be used. More particularly, information stored in document data structures that correspond to documents accessed by a user within a particular time period (e.g., past hour, past day, past week or past month) may be combined by, for example, feature vector addition, to create data structure 700. In some implementations, rather than performing a feature vector addition to generate data structure 700, all relevant document feature vectors may be compared to determine words and classifications that exist in a threshold number of document feature vectors, and as such, data structure 700 may only include such information.

Data structure 700 includes at least one high frequency word appearing in one or more documents viewed by a user during the particular time frame, as well as one or more classifications related to the one or more documents viewed by the user during the time frame. Data structure 700 also includes an indication of weights that are, or are not, associated with the words and classifications. The determination of whether a particular data point is to be weighted may be based on whether the data point demonstrates a threshold degree of responsiveness to a user's interests. For example, if a word is deemed to be important to a document browsed by a user because the word is extremely frequent (e.g., 50 words of a 100 word document are the particular word) in the document or appears in a prominent position (e.g., the title), the word may be weighted to indicate the likelihood that the word is a good predictor of a user's interest in the document.

In some implementations, if a word appears in more than one, or a threshold number of, document feature vectors used to generate data structure 700, the word also may be weighted. In another example, if a classification of a document viewed by a user is the same as (e.g., identical) or similar to (e.g., within a same super-category) classifications of documents frequently viewed by the user or information in an interest profile provided by, or created for, the user, the classification may similarly be weighted to indicate that the classification is a good predictor of a user's interest in the document.

The data structure 700 also includes an indication of a time and date associated with each of the phrases and classifications included in the data structure 700 (e.g., a time and date at which a document that included the phrase or classification was accessed by the user).

More particularly, data structure 700 includes words 701 "Dorothy," "Oz" and "Wizard," of which "Dorothy" and "Wizard" are weighted. Data structure 700 also includes classifications 702 "Movies," "Theatre" and "Movie Trivia," of which "Movies" and "Movie Trivia" are weighted. The words "Dorothy" and "Wizard," as well as the classifications "Movies" and "Movie Trivia" were included in documents accessed by the user at 8:15 AM on Aug. 25, 2006. The word "Oz" and the classification "Movie Trivia" were included in documents accessed by the user at 8:00 AM on Aug. 25, 2006.

Data structure 700 may be constantly updated as time moves forward. In some implementations, data structure 700 may include information related to all documents accessed for which a feature vector has been generated in a time frame that corresponds to a largest possible time component. For example, if the largest possible time component is "past month," the data structure 700 may include information from all documents accessed at a time and date that is equal to, or less than, one month prior to the present time and date. As such, the data structure 700 may be updated regularly, for example, on a predetermined schedule (e.g., every hour) to continually remove information that is older than the largest time component.

Alternatively, data structure 700 may be generated by host 840 on the fly whenever a search request and corresponding time component is received. For example, a search query "Toto" may be received at 9:00 AM on Aug. 25, 2006, with a corresponding time component of "past hour." In response to receipt of the search query, the host 840 may identify documents that were accessed by the user anytime after 8:00 AM on Aug. 25, 2006 (i.e., within the past hour). Information included in those documents accessed within the past hour then may be used by host 840 to generate information to be included in data structure 700. As such, the search query feature vector (e.g., data structure 710) may simply be compared with a portion of a time-oriented profile (e.g., data structure 700) that has already taken into account the specified time component.

Data structure 710 illustrates a collection of information associated with a search query, such as, for example, the search query "Toto." More particularly, and in this example, the data structure 710 includes an entire search query 711 "Toto," a time and date 712 when the search query was received "9:00 AM Aug. 25, 2006," and whether the query is a specialized query 713 "no." A search query may be a specialized query if the query was entered by a user into a specialized search engine, such as, for example, a video search engine, or an image search engine, where all search results provided for queries entered into the specialized engine are of the specialized type. Alternatively, or additionally, a search query may be deemed to be a specialized query if the user provides specialized instructions with the search query, such as, for example, by selecting a type of search result (e.g., video search results) desired using a radio button, checkbox, or other UI element.

Data structure 710 also includes potential classifications 714, which indicate potential classifications for the search query, or, in other words, possible interpretations of the search query. More particularly, the search query "Toto" may be associated with a "band" classification, a "plumbing products" classification and/or a "movies" classification. The query 711 and potential classifications 714 may be used in a comparison of the search query with identified words, phrases and classifications from within documents browsed by a user during a particular pre-search time frame to either determine if search results may be informed by information included in the browsed documents or to suggest a time component to a user, as described above. In some implementations, as shown in UI 100D of FIG. 1D, the potential classifications 714 may be provided to a user upon entry of a search query in order for the user to manually adjust the search query to take into account the category to which the user's true information need relates.

Data structures 700 and 710 may be used during process 200 of FIG. 2 to relate a search query "Toto," as represented by data structure 710, to a time-oriented profile, as represented by data structure 700, based on a corresponding time component (e.g., "past day"). To perform the relating, various methods of feature vector comparison may be used, such as, for example, a determination of an angle or difference between two feature vectors.

In one example, the data structure 710 may be compared to data structure 700. Prior to such action, it may be determined that the information in data structure 700 is associated with a time component that corresponds to the search query "Toto," such as, for example, "past hour." As such, data structure 700 may represent only the "past hour" portion of a time-oriented profile (e.g., only phrases, words and classifications shown in data structure 700, which were included in a larger time-oriented profile, were included in documents accessed by a user within the past hour), and as such, the entire contents of data structure 700 may be compared with data structure 710. Alternatively, data structure 700 may represent an entire time-oriented profile (e.g., a past hour time-oriented profile), in which all of the information included within data structure 710 (and the past hour time-oriented profile) were included in documents accessed by the user within the past hour. In either case, and by way of example, because the classification "movies" appears in data structures 710 and 700, a match may be determined, and, thus, information included in data structure 700 may be used to adjust the search query "Toto" to take into account information related to pre-search browsing behavior of a user who supplied the search query.

The communications system 800 of FIG. 8 includes a client 810 configured to interface with a host 840 (that accesses a search engine 850) via a network 830 and an intermediary 820. The client 810 is configured to receive a search query and a corresponding time component from a user. The client 810 may provide the search query and corresponding time component to the host via intermediary 820 and network 830. The host 840 may be configured to adjust the search query so that search results are responsive to content included in web pages browsed by the user during a particular time frame that corresponds with the time component (and stored in a time-oriented profile) for a user's web browsing behavior. The host 840 may be configured to provide the adjusted search query to the search engine 850 and, in response, receives search results therefrom. The host 840 then may provide the search results to the client 810, via network 830 and intermediary 820, for display to the user.

Each of the client 810 and the host 840 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 810 and host 840 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium that is capable of being delivered to the client 810, host 840 or intermediary 820.

The client 810 may include one or more devices capable of accessing content on the host 840. The host 840 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

More particularly, client 810 may be configured to receive a search query and corresponding time component from a user and provide the search query and time component to host 840. Client 810 also may be configured to receive corresponding search results from the host 840. Client 810 may display one or more UIs for a user to enter the search query and time component and to display the search results.

The network 830 provides a direct or indirect communication link between the client system 810 and the host 840, irrespective of physical separation. Examples of a delivery network 830 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The host 840 generally includes one or more devices configured to receive a search query and return search results adjusted to be responsive to content included in web pages stored in a time-oriented profile associated with the user. Host 840 may access search engine 850, which is capable of producing search results for search queries. The host 840 may include a general-purpose computer having a central processor unit (CPU), and memory/storage devices that store data and various programs such as an operating system and one or more application programs. Other examples of a host 840 includes a workstation, a server, a special purpose device or component, a broadcast system, other equipment, or some combination thereof capable of responding to and executing instructions in a defined manner. The host 840 also may include an input/output (I/O) device (e.g., video and audio input and conversion capability), and peripheral equipment such as a communications card or device (e.g., a modem or a network adapter) for exchanging data with the network 830.

The host 840 is generally capable of executing instructions under the command of a controller. The host 840 may be used to provide content to the client 810. The controller may be implemented by a software application loaded on the host 840 for commanding and directing communications exchanged directly with the client 810 or through intermediary 820. Other examples of the controller include a program, a piece of code, an instruction, a device, a computer, a computer system, or a combination thereof, for independently or collectively instructing the client 810 or the host 840 to interact and operate as described. The host 840 may be embodied permanently or temporarily in any type of machine, component, physical or virtual equipment, storage medium capable of providing instructions to the client 810, the intermediary 820 or the host 840.

Search engine 850 typically resides on the host 840 and is capable of executing searches based on a search query adjusted by host 840, as described above. Examples of search engine 850 include a program, a piece of code, an instruction, a device, a computer, a computer system, or a combination thereof, for independently or collectively instructing host 840 to interact and operate as described.

In some implementations, the host 840 may be configured to provide user-specific search results (e.g., search results that have been informed by a user's pre-search browsing behavior), while maintaining the privacy of the user requesting the search results. For instance, the client 810 may route document feature vectors (representing documents browsed by a user prior to searching) and search query vectors (representing a search query) through an intermediary, such as intermediary 820 before sending them to the host 840 via the network 830. As such, and for example, the intermediary 820 may strip the feature vectors of identifying information (e.g., a screen name or other identifier associated with the user) and, instead, tag the feature vectors with a random identifier that cannot be traced back to the user. Before sending the feature vector tagged with the random identifier to the host 840, intermediary 820 may store a relationship between the random identifier and the user, where the relationship may be encoded to maintain the privacy benefits of routing the feature vectors through the intermediary 820. The intermediary 820 then may send the feature vectors to the client 840 and receive, in response, search results that are associated with the random identifier. The intermediary 820 then may determine a user to whom the search results belong (based on the encoded relationship) and forward the search results to client 810 for display to the user.

Time-oriented profiles for users may be stored locally on client 810, or alternatively, may be stored remotely at host 840. In implementations where privacy is of more concern, the time-oriented profiles may be stored locally at client 810 or may be stored remotely at host 840 in association with a scheme for preventing access to a time-oriented profile for use by anyone other than the user to which the profile belongs.

Figure 9:
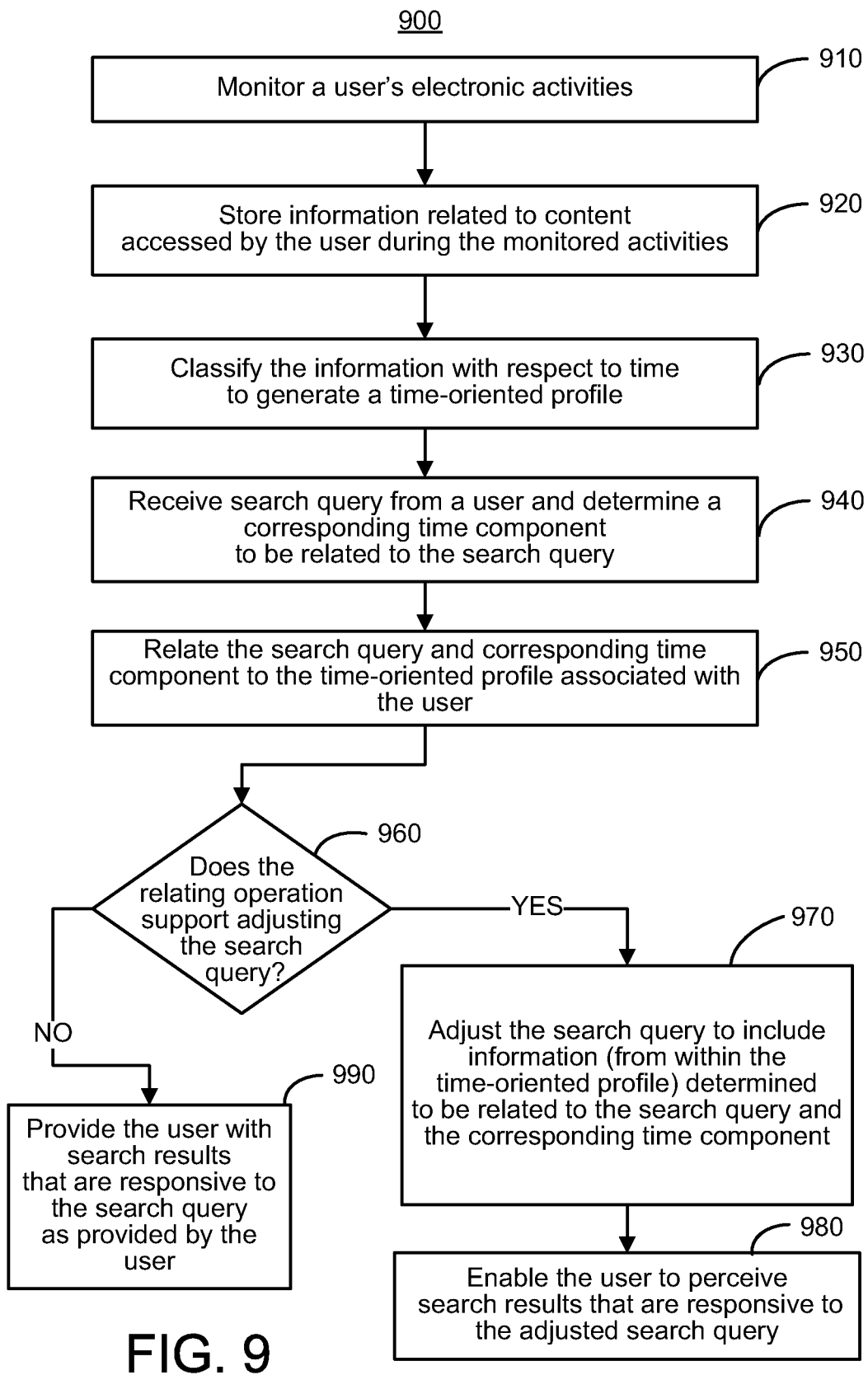
FIG. 9 is a flow chart of an exemplary process for enabling a user to perceive search results that are responsive to the user's true information need, as represented by a search query, and the user's pre-search electronic activities.

The exemplary process 900 of FIG. 9 is configured to allow a user to perceive search results that are responsive to the user's true information need, as represented by a search query. Generally, the operations of process 900 may be used in conjunction with the systems and configurations described above with respect to FIG. 8. For example, process 900 may be performed by host 840 of FIG. 8, as described in more detail below, and for convenience, host 840 is referenced as performing the process. However, similar methodologies may be applied in other implementations where different components are used to define the structure of the system, or where the functionality is distributed differently among the components shown.

Host 840 monitors a user's electronic activities (910). Electronic activities may include browsing of Internet documents (e.g., web pages, blog entries and images), document creation and editing, electronic messaging (e.g., email, text messages, instant messages), and perception of audio/video content (e.g., listening to mp3s or viewing streaming video). Host 840 may monitor the user's online activities (e.g., web browsing and messaging) by, for example, examining the user's browser history, cached web pages or email outbox. In addition, host 840 may monitor the user's local activities (e.g., document creation and perceiving audio/video content that is stored locally) by, for example, examining recently-created or accessed files.

Host 840 stores information related to the content accessed by the user during the monitored activities (920). For example, the host 840 may identify and store keywords and phrases associated with content accessed by the user (e.g., the keywords "birthday" and "party" in an electronic invitation sent via email), a classification associated with content accessed by the user (e.g., a "sports" classification for a news article related to a soccer game), a file name or title of content accessed by the user (e.g., "Presentation Document.doc" or "August 25th Presentation"), a source or access information for content accessed by the user (e.g., a uniform resource locator (URL) of a web page or path name for a file) and information included in metadata associated with content accessed by the user (e.g., file size, date of creation and permissions). As described above with respect to FIG. 2, information related to content accessed by a user may be stored in a feature vector, such as, for example, the document feature vectors 600 and 610 of FIG. 6.

Host 840 classifies the identified and stored information with respect to time to generate a time-oriented profile (930). More particularly, host 840 determines a classification for each content item that was identified by host 840 as being associated with content accessed by the user. For example, the file name "Presentation Document.doc" may be associated with a "work" classification. In some implementations, the entirety of a particular piece of content accessed by the user (e.g., a document) may be classified, as opposed to classifying merely information gleaned from the particular piece of content (e.g., a keyword identified within the document).

The identified and stored information is also associated with a time frame during which the user accessed the content that included the information. For example, a user may have read an email message at 8:45 AM on Aug. 25, 2006. The email message may have included the keyword "birthday," which host 840 identified and stored. The keyword "birthday," as well as (in some implementations) an identifier related to the particular piece of content in which the keyword was identified (e.g., the email message) may be associated with the time 8:45 AM on Aug. 25, 2006.

The identified information, along with an associated classification and time frame, may be stored in a time-oriented profile associated with the user who accessed the content. If no time-oriented profile has been previously created for the user, such a profile may be generated at this time. The time-oriented profile may include items associated with content accessed by a user based on time frames during which the content was accessed. In some implementations, identified information (e.g., a keyword) may be stored in a time-oriented profile only until it becomes stale. A piece of identified information may be deemed to be stale after a predetermined default, or user-selected, amount of time has elapsed. For example, information may only be stored within a time-oriented profile for 5 days. Thus, at 8:45 AM on Aug. 30, 2006, the keyword "birthday" (as described in the previous example) and associated email message may be removed from the time-oriented profile. Additionally, or alternatively, the amount of time that information remains in a time-oriented profile may be based on storage space, rather than a time constraint.

Host 840 receives a search query from a user and determines a corresponding time component to be related to the search query (940). A user may provide a search query via a UI associated with an online or desktop search application. A time component corresponding to the search query may be similarly provided by a user. In some implementations, a slider, as described above with respect to UIs 100A-100D of FIGS. 1A-1D, or a dial, a drop-down menu, text entry field or other input mechanism may be used by a user to indicate a particular time component (e.g., "past day). Alternatively, or additionally, and as also described above, a user may select a time component that is recommended by host 840 via a radio button, drop-down menu or other input mechanism, including a rejection of an automatically selected time component.

Host 840 relates the search query and corresponding time component to the time-oriented profile associated with the user (950). More particularly, host 840 may examine information included in the time-oriented profile to identify items that are related to the search query and associated with a time frame that satisfies the time component. For example, a keyword "birthday" may be stored in the time-oriented profile and may be deemed to relate to a search query for "cake" because both words belong to a "party" category.

Host 840 determines if relating the search query and corresponding time component to the time-oriented profile supports adjusting the search query (960). In other words, host 840 determines whether information included in the time-oriented profile is related to the search query and satisfies the time component corresponding to the search query.

If the relating operation 960 supports adjusting the query, the host 840 adjusts the search query to include the information from within the time-oriented profile that has been determined to relate to the search query (970). The host 840 then enables the user to perceive search results that are responsive to the adjusted search query (980). More particularly, the host 840 provides the user with search results that are responsive to the search query and the corresponding time component, and thus, are more likely to satisfy the user's true information need.

If the relating operation 960 does not support adjusting the query, the host 840 provides the user with search results that are responsive to the search query as provided by the user. More particularly, if no information in the time-oriented profile is deemed to be related to the search query and corresponding time component, the host 840 does not adjust the search query and the search results may not be influenced by the user's pre-search activities.

In some implementations, and as described, the techniques described herein may be integrated as a component or functionality of a particular search engine. Alternatively, such techniques may be supplied to a user as a third party plug-in that may be used in association with one or more particular search engines. As such, the plug-in may be configured to work with existing browsers, as well as those that are yet to be brought to market.

The plug-in may be configured to inform search results with pre-search activities performed by a user in a variety of applications (e.g., browsers, word processing, audio/video and email). To do so, the plug-in may monitor a user's activities in a variety of applications, as described above with respect to process 900 of FIG. 9. A user may enter a search query into an interface provided by the plug-or in a traditional search engine. A traditional search engine may include an Internet search performed by an online search engine, a search engine integrated into a particular web site or a search engine provided by an online service provider, a search of a user's local computer or a search for both Internet and local content.

If the user provides the search query, and a corresponding time component, into an interface provided by the plug-in, the plug-in may adjust the search query, as described above, based on the user's pre-search activities and then submit the search query to a default or user-selected search engine. If the user provides the search query into a traditional search engine, the plug-in may automatically intervene, and adjust the search query based on the user's pre-search activities, prior to allowing the traditional search engine to initialize the search. As such, the user may reject an adjustment of a search query performed by the plug-in, and, in some implementations, provide the plug-in with an alternate adjusted search query or indicate that the plug-in should allow the search to be performed without adjusting the search query.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A method comprising:
   monitoring content browsed by a user during a period of time;
   determining one or more topics associated with the monitored content;
   receiving a search query from the user;
   identifying, using at least one processor, at least one topic of the one or more topics that is related to the search query;
   prior to processing the received search query, presenting the at least one topic to the user along with a request for a confirmation that the user is searching for results related to the at least one topic;
   receiving a response to the request for a confirmation that the user is searching for results related to the at least one topic; and
   processing the received search query in accordance with the received response.

2. The method as recited in claim 1, wherein monitoring content browsed by the user during the period of time comprises monitoring one or more websites visited by the user during the period of time.

3. The method as recited in claim 1, wherein monitoring content browsed by the user during the period of time comprises identifying one or more search results selected by the user during the period of time.

4. The method as recited in claim 1, wherein monitoring content browsed by the user during the period of time comprises identifying one or more search queries made by the user during the period of time.

5. The method as recited in claim 1, further comprising:
   analyzing one or more documents within the monitored content browsed by the user during the period of time;
   determining, based on the analysis of the one or more documents, one or more words or phrases descriptive of content in the one or more documents; and
   wherein the identifying the at least one topic is based on the one or more words or phrases descriptive of content in the one or more documents.

6. The method as recited in claim 5, further comprising identifying one or more search results based on the search query.

7. The method as recited in claim 6, wherein identifying at least one topic of the one or more topics that is related to the search query comprises identifying one or more of the search results related to at least one of the one or more topics associated with the monitored content.

8. The method as recited in claim 1, wherein prior to processing the received search query, presenting the at least one topic to the user along with the request for the confirmation that the user is searching for results related to the at least one topic comprises, prior to processing the received search query, presenting a graphical user interface with a search query field displaying the search query and a question below the search query field asking the user if they were searching for results related to the at least one topic.

9. The method as recited in claim 8, further comprising:
   receiving a response to the request for a confirmation that the user is searching for results related to at the least one topic, wherein the received response comprises an indication that the user was not searching for results related to the at least one topic; and
   presenting one or more categories related to one or more search results for the user to select.

10. A graphical user interface produced on a computing device having a display associated therewith, the graphical user interface comprising:
    a search query field containing a search query entered by a user;
    an indication of content browsed by the user during a period of time, the content browsed by the user during the period of time being related to the search query;
    an indication of one or more determined topics of the content browsed by the user during the period of time; and
    a first selectable option allowing the user to provide a confirmation, in response to the search query entered by the user and prior to processing the search query, of searching for information related to the one or more determined topics.

11. The graphical user interface as recited in claim 10, wherein upon receiving a selection of the first selectable option, search results relating the one or more determined topics of the content browsed by the user during the period of time are displayed on the display below the search query field.

12. The graphical user interface as recited in claim 10, further comprising a second selectable option, the second selectable option allowing the user to provide a confirmation, in response to the search query entered by the user and prior to processing the search query, that they are not searching for information related to the one or more determined topics of the content browsed by the user during the period of time.

13. The graphical user interface as recited in claim 12, wherein upon receiving a selection of the second selectable option, one or more categories related to one or more search results from the search query are displayed on the display below the search query field.

14. The graphical user interface as recited in claim 13, wherein upon receiving a selection of a category of the one or more categories, search results relating the one or more categories are displayed on the display below the search query field.

15. The graphical user interface as recited in claim 10, further comprising a first group of search results displayed, in response to a detected selection of the first selectable option, on the display below the indication of content browsed by the user during the period of time and the indication of one or more determined topics of the content browsed by the user during the period of time, the first group of search results comprising search results returned using a supplemented search query comprising the search query and the one or more determined topics.

16. The graphical user interface as recited in claim 15, further comprising:
- a search results header indicating general results for the search query displayed on the display; and
- a second group of search results displayed on the display below the search results header, the second group of search results comprising search results returned using the search query.

17. A method comprising:
- monitoring content browsed by a user during a period of time;
- determining one or more topics of the monitored content;
- receiving a search query from the user;
- prior to processing the received search query, identifying, using at least one processor, at least one topic of the one or more topics that is related to the search query;
- in response to identifying at least one topic of the one or more topics that is related to the search query, supplementing the search query from the user with the at least one topic of the one or more topics;
- processing the supplemented search query; and
- providing a first search results header and a first set of search results based on the processed supplemented search query.

18. The method as recited in claim 17, further comprising providing a second search results header and a second set of search results based on the search query from the user.

19. The method as recited in claim 17, wherein monitoring content browsed by the user during the period of time comprises one or more of:
- determining one or more search results selected during the period of time;
- determining one or more search queries made by the user during the period of time; and
- monitoring one or more websites visited by the user during the period of time.

20. The method as recited in claim 17, further comprising receiving an indication from the user of a length of the time period.

* * * * *